United States Patent [19]

Voltmer

[11] Patent Number: 4,687,535

[45] Date of Patent: Aug. 18, 1987

[54] VACUUM DRUM LABELING SYSTEM

[75] Inventor: Helmut Voltmer, Park Ridge, N.J.

[73] Assignee: New Jersey Machine, Inc., Fairfield, N.J.

[21] Appl. No.: 845,524

[22] Filed: Mar. 28, 1986

[51] Int. Cl.[4] .............. B32B 31/10

[52] U.S. Cl. .............. 156/361; 156/351; 156/363; 156/521; 156/568; 156/DIG. 33

[58] Field of Search .............. 156/351, 361, 362, 363, 156/521, 568, DIG. 31, DIG. 33

[56] References Cited

U.S. PATENT DOCUMENTS 3,864,187 2/1975 Carter .............. 156/568 X 4,526,645 7/1985 Malthouse et al. .............. 156/568 X

*Primary Examiner*—Robert A. Dawson

*Attorney, Agent, or Firm*—Charles E. Baxley

[57] ABSTRACT

A system for applying pressure sensitive labels to articles, such as bottles, includes a vacuum drum having an outer cylindrical surface, a plurality of vacuum passages in open communication with the outer surface and equally spaced around the drum, means for delivering pressure sensitive labels onto the outer surface of the drum at a predetermined speed of advance and means for rotating the drum with a predetermined linear speed of the outer surface which is greater than the speed at which labels are delivered to the outer surface, so that the outer surface slips on each label until vacuum is applied to a vacuum passage at a label pick-up station, whereby the vacuum picks up the front edge of each label, and whereby labels are spaced uniformly on the drum from the label pick-up station to a label applying station.

4 Claims, 1 Drawing Figure

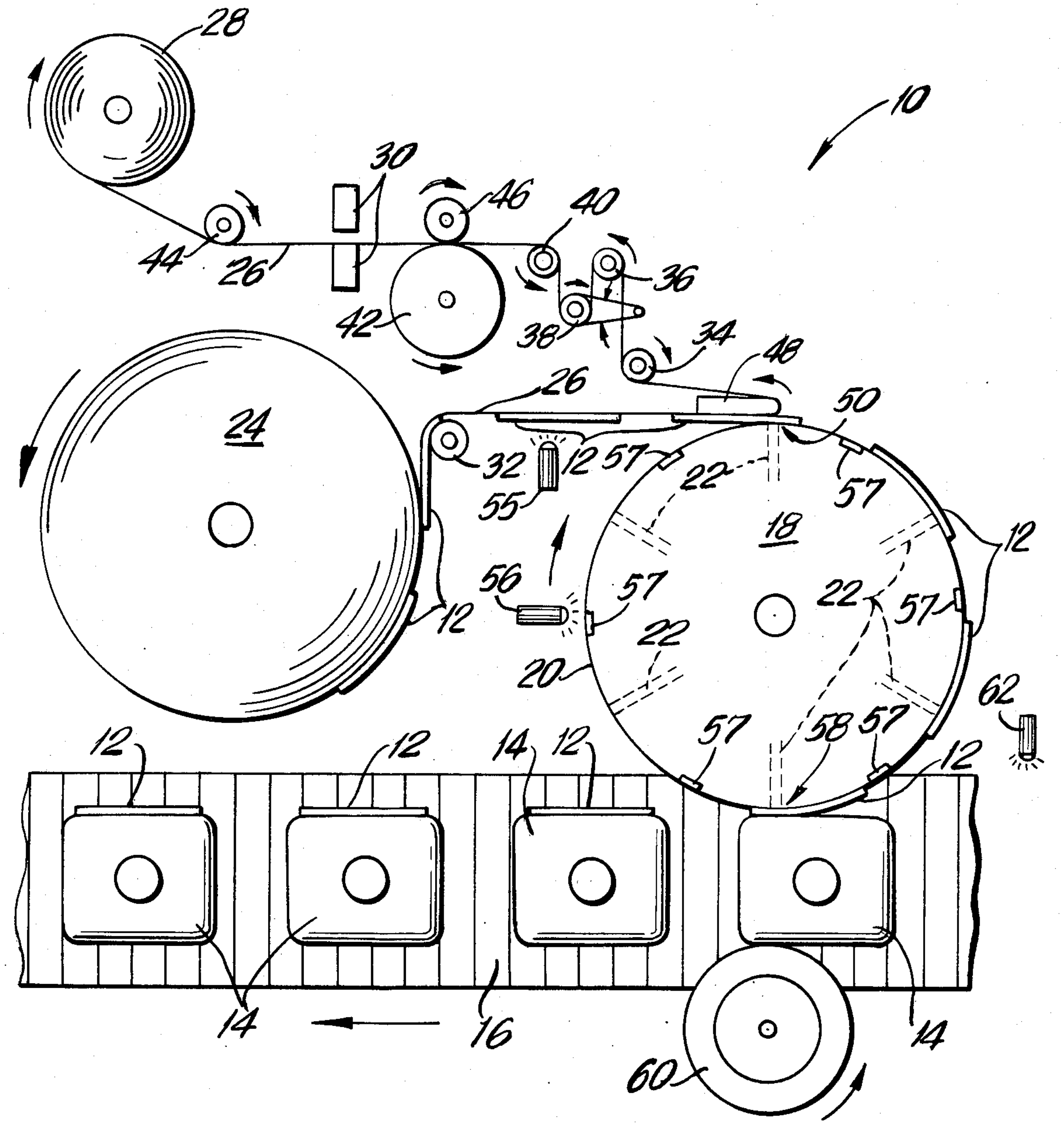
28
10
30
46
40
44
26
36
42
38
34
48
24
26
50
32
12
57
22
57
55
18
12
56
22
57
57
12
22
20
62
12
12
14
12
57
58
57
12
14
16
14
60

VACUUM DRUM LABELING SYSTEM

BACKGROUND OF THE INVENTION

This invention relates to a labeling system and more particularly to such a system in which pressure sensitive labels are applied to products, such as bottles or similar containers.

Such known systems are generally quite complex, cumbersome and erratic in function.

It is an important object of the present invention to provide such a system which is much simpler, easier to use and surer in operation than such known systems.

SUMMARY OF THE INVENTION

In the inventive system, pressure sensitive labels are applied to articles, such as bottles or similar containers. A vacuum drum has an outer cylindrical surface. A plurality of vacuum passages are in open communication with the outer surface and equally spaced around the drum. Means are provided for delivering pressure sensitive labels onto the outer surface of the drum at a predetermined speed of advance. Means are also provided for rotating the drum with a predetermined linear speed of the outer surface which is greater than the speed at which labels are delivered to the outer surface. In result, the outer drum surface slips on each label until vacuum is applied to a vacuum passage at a label pick-up station and the vacuum picks up the front edge of each label, whereby labels are spaced uniformly on the drum from the label pick-up station to a label applying station.

As disclosed, there are six vacuum passages, each spaced 60° from its two neighbors, but the number of vacuum passages could be varied to suit requirements.

DESCRIPTION OF THE DRAWING

In the drawing, the single FIGURE depicts, somewhat schematically, a labeling system embodying the invention.

DESCRIPTION OF THE INVENTION

The drawing illustrates generally at 10 a preferred labeling system embodying the invention. System 10 applies labels 12 to cylindrical or rectangular products, shown typically as rectangular bottles 14.

System 10 comprises a conveyor 16 which conveys bottles 14 at predetermined constant spacing in the direction of the arrow (to the left as shown), a vacuum drum 18 having an outer cylindrical surface 20 defining a drum axis and a plurality of vacuum passages 22 each in open communication with outer surface 20 and extending therefrom toward the drum axis and equally spaced circumferentially therearound. As shown, there are six passages 22, each spaced 60° from its two neighboring passages 22.

System 10 further comprises means for delivering labels 12 from a supply thereof on a supply drum 24 to vacuum drum 18.

Labels 12 are of the pressure sensitive variety, each having on one surface thereof a pressure sensitive adhesive. When labels 12 are would on supply drum 24, the surfaces having the adhesive confront the axis of supply drum 24 and labels 12 are adhered to and carried by a backing strip or web 26.

System 10 additionally comprises a rewind drum 28 on which web 26 is wound up, a brake 30, idler rollers 32, 34, 36, 40, and 44, a constantly driven feed roller 42 and a lift roller 46 opposite driven roller 42. Lift roller 46 is movable between the illustrated position in which rollers 42 and 46 bight backing strip 26 therebetween and a retracted position in which no such bight is present. When roller 46 moves to the retracted position, brake 30 is activated by conventional mechanism (not shown), engaging web 26 and causing it to stop.

System 10 additionally includes a register roller 38 over which web 26 passes between passing over idler rollers 36 and 40, which are stationary. Register roller 38 is controlled by a label position sensor 55 which will command register roller 38 to advance or retard web 26. System 10 also has a gate sensor 56 and pitch marks 57 evenly spaced around the outer surface 20 of vacuum drawn 18 in predetermined relationship to the locations where vacuum passages 22 communicate with outer surface 20. The gate for label position sensor 55 is governed by pitch marks 57 and gate sensor 56. If labels 12 are late in relation to pitch marks 57, register roller 38 will move downwardly, thus advancing web 26, whereas if labels 12 are early in relation to pitch marks 57, register roller will move upwardly, thus retarding web 26.

Alternatively to register roller 38, the speed of rotation of driven roller 42 may be adjustable, thereby to advance or retard web 26, this adjustment being controlled by label position sensor 55, gate sensor 56 and pitch marks 57.

System 10 further comprises a peel plate 48 which serves to separate labels 12 from web 26 at a label pick-up station 50 on vacuum drum 18 where labels 12 are separated from web 26 and picked up tangentially by outer surface 20 of drum 18, with the surface having the adhesive facing outwardly.

Substantially diametrically opposite label pick-up station 50 is a label applying station 58 on vacuum drum 18 where labels 12 are transferred tangentially from drum 18 to bottles 14. A driven roll 60 spaced from and confronting station 58 serves to position and maintain bottles 14 for reception of labels 12. That is, drum 18 and driven roll 60 bight bottles 14 therebetween.

Vacuum drum 18 is motor driven to rotate continuously in the direction of the arrow (clockwise as shown) at a speed of rotation such that outer cylindrical surface 20 travels at a predetermined linear or tangential speed which is the same as the speed of advance of conveyor 16.

In known fashion, each vacuum passage 22 is timed to arrive at label applying station 58 coincidentally with the arrival of the application point of a bottle 14 at station 58. The application point for a round bottle is generally the centerline. For a rectangular bottle the application point may vary, depending on requirements, from the leading, edge to almost the trailing edge.

Driven feed roller 42 is motor driven to rotate continuously in the direction of the arrow (clockwise as shown) at a speed of rotation such that web 26 is wound up on drum 28 at a linear speed which is lower than the linear speed of outer surface 20 of vacuum drum 18.

The rotational speed of feed roller 42 is adjusted for the particular length of label 12, so that while roller 42 continuously rotates, the front edge of each successive label 12 arrives at label pick-up station 50 exactly as each successive vacuum passage 22 arrives at that point.

The speed difference between vacuum drum 18 and feed roller 42, and thereby the difference in linear velocity of their respective peripheries is essential to maintain a continuous forward motion of web 26 while achieving the separation of labels 12 on the periphery of vacuum drum 18, governed by the pitch of drum 18, i.e., the linear distance between successive vacuum passages 22.

In normal operation, i.e., when there is no gap in the procession of bottles 14 approaching label applying station 58, a vacuum is applied to each vacuum passage 22 at label pick-up station 50 and maintained therefrom to label applying station 58 where the vacuum is terminated. In result, the vacuum picks up the leading edge of each label 12 as it arrives at label pick-up station 50 and releases that label 12 to permit its application to a bottle 14 at label applying station 58.

If, for whatever reason, there is a gap in the procession of products approaching label applying station 58, a missing product sensor 62 will signal lift roller 46 to move away from feed roller 42, thus activating brake 30 and stopping web 26. When web 26 is stopped, no label 12 is transferred at label pick-up station 50 to surface 20 of drum 18, which label 12 is destined to arrive at label applying station 58 when there will be no product 14 to receive that label 12.

Thus, system 10 includes means for sensing the absence or presence of a gap in the procession of bottles 14 and for delivering a label 12 if there is no absence of such gap and for not delivering a label 12 if there is such a gap. Such means is well known and therefore the details need not be disclosed herein.

It is stated above that feed roller 42 rotates at a speed such that web 26 travels at a speed which is lower than the linear speed of outer surface 20 of drum 18. As a result of that speed difference, the vacuum which is applied to passages 22 at label pick-up station 50, picks up the front edges of labels 12 so that labels 12 are evenly spaced on surface 20 from station 50 to station 58 and are delivered to bottles 14 in proper fashion.

From the foregoing, it is apparent that the invention achieves the stated objects and advantages and others.

The disclosed details are exemplary only and are not to be taken as limitations on the invention except as those details may be included in the appended claims.

What is claimed is:

1. In a labeling system for applying pressure sensitive labels to articles, wherein said labels are initially carried by a web, a drum having an axis and an outer cylindrical surface, a plurality of vacuum passages in open communication with said outer surface and equally spaced circumferentially around said drum, means for continuously advancing said web and delivering labels therefrom onto said outer surface of said drum at a label pick-up station at a predetermined speed of advance, and means for rotating said drum with a predetermined linear speed of said outer surface which is greater that said predetermined speed of advance at which labels are delivered to said outer surface, so that said outer surface slips on each said label until vacuum is applied to a said vacuum passage, whereby the vacuum picks up the front edge of the label and labels are spaced uniformly on said drum from the pick-up station to a label applying station.

2. A system according to claim 1 wherein there are six said vacuum passages, each spaced 60° from its two neighbors.

3. A system according to claim 1 further including a conveyor for delivering articles to said label applying station.

4. A system according to claim 3 wherein said conveyor delivers articles to said label applying station at a speed which is the same as the linear speed of advance of said outer drum surface.

* * * * *